Sept. 18, 1945.   H. M. NORMAN   2,385,101
ELECTRIC SPEEDOMETER
Original Filed Dec. 5, 1938   3 Sheets-Sheet 1
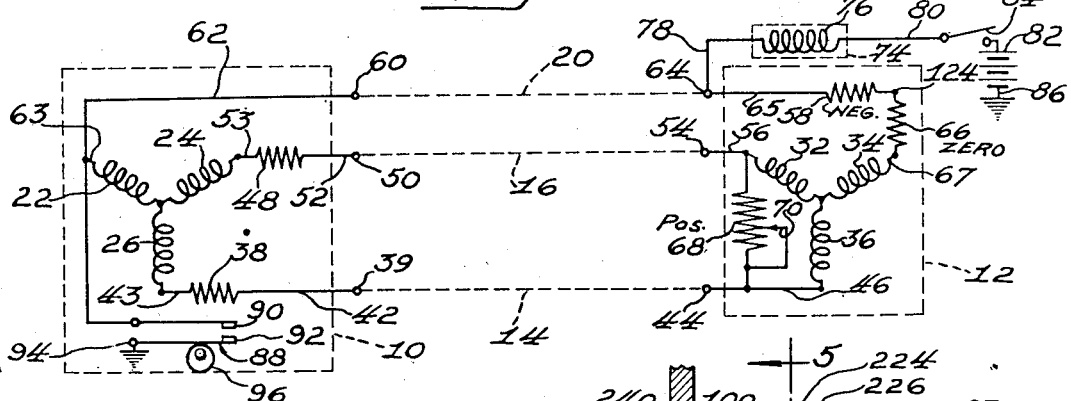
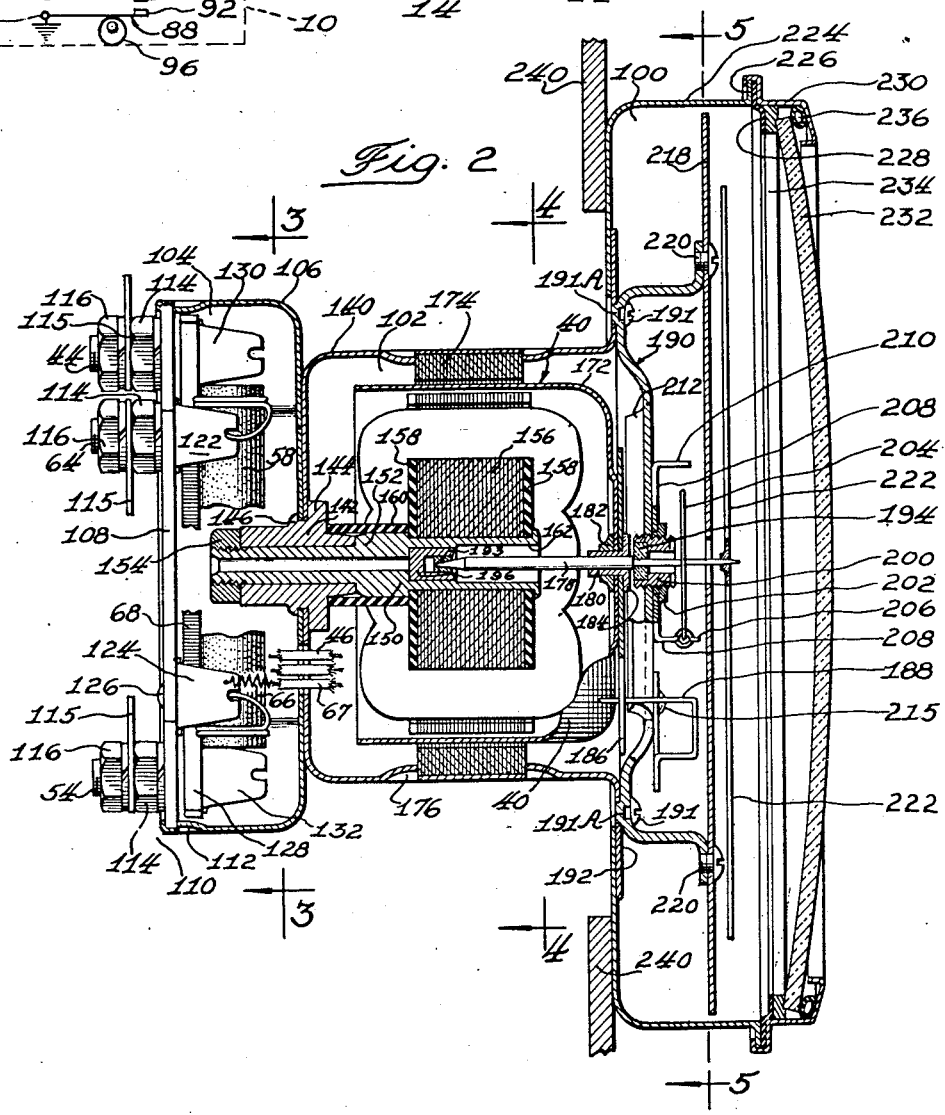
INVENTOR:
HORACE M. NORMAN
BY Williams, Bradbury & Hinkle
ATTORNEYS Sept. 18, 1945. H. M. NORMAN 2,385,101
ELECTRIC SPEEDOMETER
Original Filed Dec. 5, 1938 3 Sheets-Sheet 2
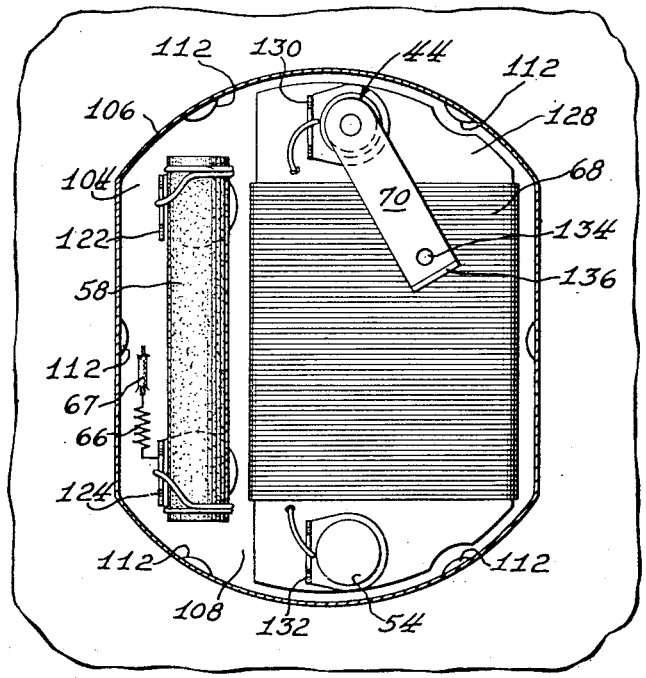
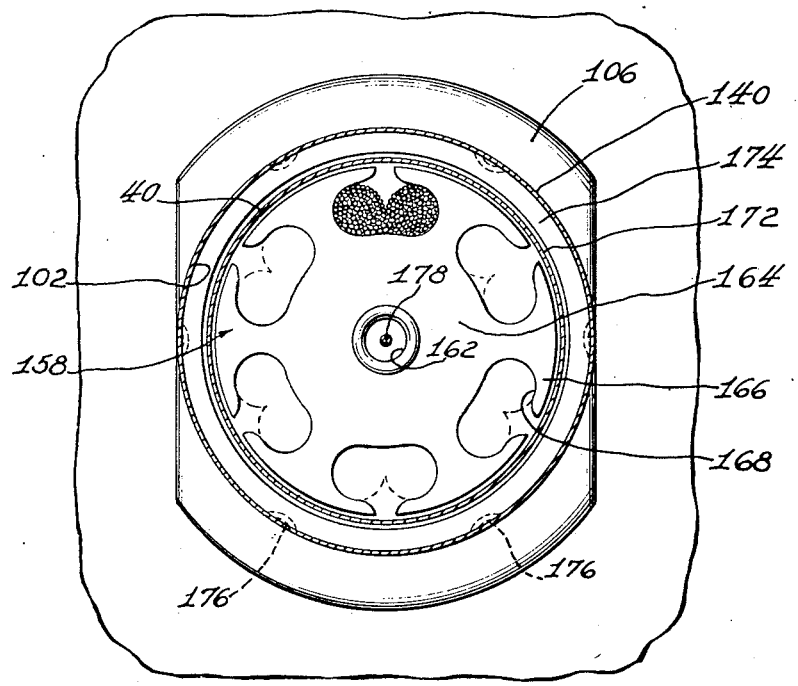
INVENTOR:
HORACE M. NORMAN
BY Williams, Bradbury & Hinkle
ATTORNEYS Sept. 18, 1945.     H. M. NORMAN     2,385,101
ELECTRIC SPEEDOMETER
Original Filed Dec. 5, 1938     3 Sheets-Sheet 3

INVENTOR:
HORACE M. NORMAN
ATTORNEYS

Patented Sept. 18, 1945

2,385,101

UNITED STATES PATENT OFFICE 2,385,101

ELECTRIC SPEEDOMETER

Horace M. Norman, Skokie, Ill., assignor to Stewart-Warner Corporation, Chicago, Ill., a corporation of Virginia Original application December 5, 1938, Serial No. 243,977. Divided and this application April 26, 1943, Serial No. 484,590

12 Claims. (Cl. 172—245)

The present invention relates to electric speedometers and is particularly concerned with the provision of a new and improved electric speedometer adapted to be installed as part of the standard factory equipment of an automotive vehicle. The present application is a division of my copending application, Serial No. 243,977, filed December 5, 1938, now Patent No. 2,339,743, and is directed more particularly to the indicator unit forming part of the speedometer.

It has long been recognized that electric speedometers possess a number of advantages that make their use in automotive vehicles desirable, particularly where the part of the vehicle from which the indication of speed is derived is located a considerable distance from the driver's compartment, as in rear-engined vehicles. Among the advantages of electric speedometers are the elimination of the flexible shaft of the ordinary mechanical speedometer with its attendant high cost, friction losses, rapid deterioration, very undesirable whipping action, and also the obtaining of a quicker response as well as more accurate readings. Another advantage of electric speedometers resides in the fact that the mileage indicator or odometer may be located at a distance from the speedometer, thereby making it possible to provide a more advantageous distribution of the indicators upon the instrument panel.

Despite the many advantages of electric speedometers, the latter have not been used extensively because of certain difficulties. One of the more important of these is the undesirable effect upon the indicator of variations in the potential of the battery from which the speedometers are supplied with electric energy and of temperature variations.

One of the primary objects of the present invention is to provide a new and improved electric speedometer requiring no external source of energy, such as a battery.

Another of the primary objects of the invention is to provide a new and improved electric speedometer that is economical to manufacture, easy to install, easily calibrated to give accurate readings, and one that is not likely to get out of calibration despite the usage to which it is subjected.

A more specific object of the present invention is to provide a new and improved electric speedometer comprising an indicator unit having a fixed armature winding and an induction rotor rotatable thereby against a resilient restraining member.

Another object of my invention is to provide an electric speedometer with a new and improved electrically actuated indicator motor or indicator unit, as it may be more aptly termed.

Other objects and advantages of the present invention will become apparent from the ensuing description in the course of which reference is had to the accompanying drawings, in which:

Fig. 1 is a diagrammatic representation of the electrical circuits embodied in the present invention showing in particular the electrical connections between the sending and indicator units and the odometer. The rotors associated with the two units have been omitted for the purpose of simplicity, since they are not conductively coupled to the illustrated electrical circuit;

Fig. 2 is a vertical axial cross sectional view through the indicator unit;

Fig. 3 is a vertical transverse cross sectional view of the indicator unit taken along the line 3—3 of Fig. 2;

Fig. 4 is a view similar to Fig. 3 taken along the line 4—4 of Fig. 2;

Figure 5:
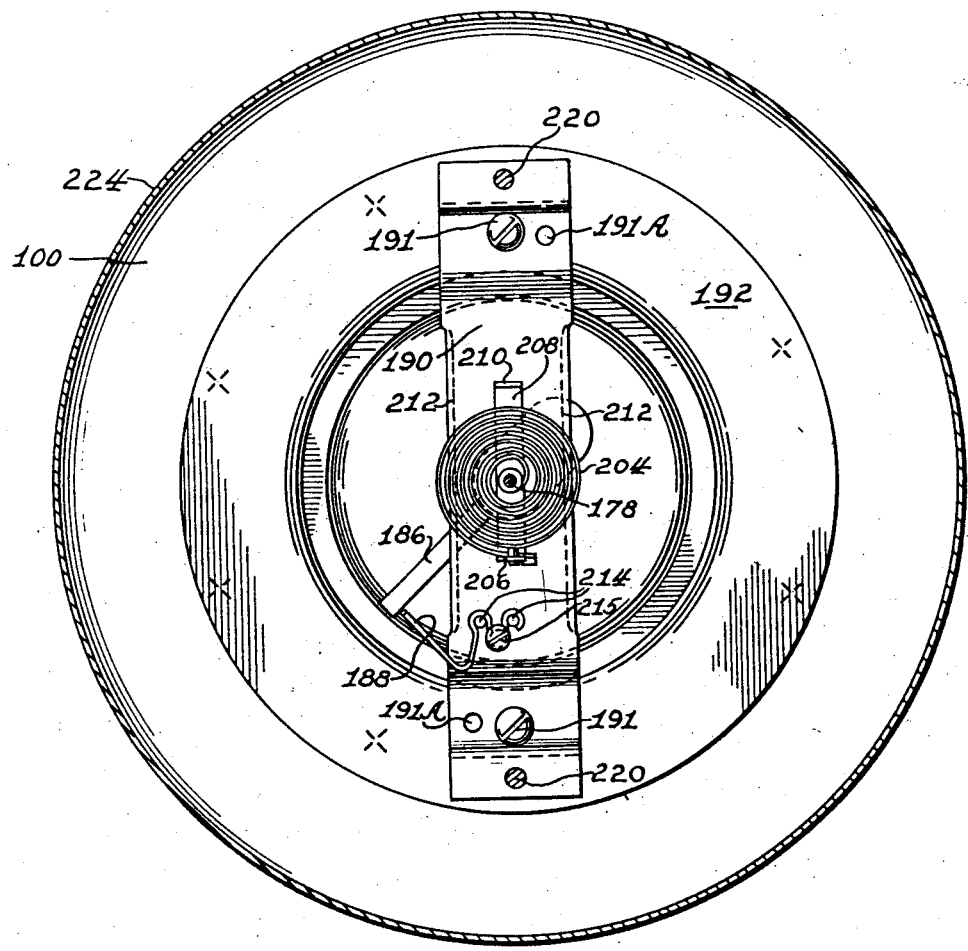
Fig. 5 is a view similar to the two preceding figures taken along the line 5—5 of Fig. 2.

Before proceeding with a detailed description of the indicator unit, to which the present invention is directed, it is deemed advisable briefly to describe the general nature of this unit and of the sending unit associated therewith, which sending unit is disclosed and claimed in my copending application Serial No. 484,589, filed contemporaneously herewith. In this brief description reference will also be had to the manner in which the sending and indicator units are electrically connected to each other, and their location with respect to the odometer and its associated circuit.

Referring, therefore, to Fig. 1, it may be noted the sending unit has been indicated by reference character 10 and the indicator unit by reference character 12. These units are connected to each other by three inter-unit conductors 14, 16, and 20 of a length dependent upon the relative locations of the sending and indicator units. In rear-engined vehicles the sending unit is located at the rear of the vehicle and the indicator unit is located in the driver's compartment so that the indications may be readily observed by the operator. While the described arrangement is particularly suited for rear-engined vehicles, its use is not limited thereto, as it may be used just as well with a vehicle driven by an engine located at the forward end thereof.

The sending unit 10 is a polyphase, preferably a three-phase, alternating current generator comprising the star-connected fixed armature windings 22, 24, and 26. These windings have associated therewith a salient pole permanent magnet rotor (not shown) rotated by a suitable means at a speed bearing a constant relationship with the speed of the rear wheels of the vehicle, irrespective of whether the wheels are driven by the engine of the vehicle. The rotation of the rotor induces a three-phase alternating current in the armature windings that is supplied to the indicator unit through the previously mentioned conductors 14, 16, and 20.

The indicator unit also consists of three star-connected fixed armature windings 32, 34, and 36, which, when supplied with alternating current, produce a revolving magnetic field, in a manner well known to those skilled in the art. The revolving magnetic field effects rotation of an induction rotor 40 (see Fig. 2), hereinafter termed a speed cup, the rotation of which is restrained by resilient means such as a spiral hair spring in a manner to be described more definitely hereinafter. The torque exerted upon the speed cup is dependent upon the magnitude and frequency of the alternating currents generated by the sending unit, and since both these characteristics are dependent upon the speed of rotation of the permanent magnet rotor, it may be seen that the speed cup assumes a position dependent upon the speed of the vehicle.

The resistances of the armatures of both the sending and indicator units, as well as of the inter-unit conductors, are dependent upon the ambient temperature and the value of the current flowing therethrough. In order to compensate for the effect of these temperature changes a number of negative temperature coefficient series resistors are provided, and these have associated therewith a shunt connected positive temperature coefficient resistor which, as will be explained hereinafter, performs another function, namely, that of adjusting the reactance of the system. The negative temperature coefficient resistors are so located as to provide compensation even though the units may be located in regions where different temperatures obtain. For example, the sending unit may be located, as in the usual installation, in a location where it is subjected to outdoor temperatures which may range to a considerable value below zero degrees F. On the other hand, the sending unit may be driven from the transmission of a rear-engined bus, where the temperature may rise to a value of approximately 200 degrees F. The indicator unit, being located in proximity to the driver's compartment, is, therefore, in a region where the temperature remains in the neighborhood of 70 degrees F. The resistors are designed not only with physical and electrical characteristics such that they provide compensation for changes in the resistance of the windings, but to overcompensate therefor, and thereby provide temperature compensation for variations in the magnetism of the permanent magnet rotor of the sending unit and in the resistance of the induction type rotor of the indicator unit. Because of the nature of the negative temperature coefficient resistors which have a coefficient that decreases in the higher temperature ranges, it has been found desirable to utilize additional compensating means when the sending unit is located in a high temperature region, as near the engine of a rear-engined bus. The additional compensation is provided by a stationary annular ring surrounding the permanent magnet rotor of the sending unit made of metal having a characteristic such that its permeability is considerably greater at low temperatures than at high temperatures. Either Simonds or Monel metal has been found satisfactory.

Referring again to Fig. 1, it may be seen that the inter-unit conductor 14 is connected in series with a resistor 38 connected between winding 26 and terminal 39 by conductors 42 and 43. Conductor 14 is connected also to terminal 44 of the indicator unit and the latter is connected to winding 36 by a conductor 46.

Inter-unit conductor 16 is connected in series with resistor 48 connected between winding 24 and terminal 50 by conductors 52 and 53. Conductor 16 is connected also to winding 32 of the indicator unit through a terminal 54 and conductor 56.

Inter-unit conductor 20 is connected in series with resistor 58, located in proximity to the indicator unit, as distinguished from the previously mentioned resistors 38 and 48 which are located in proximity to the sending unit for reasons to be considered in detail hereinafter. Inter-unit conductor 20 is connected to the third winding 22 of the sending unit through terminal 60 and conductors 62 and 63. Inter-unit conductor 20 is connected to the third winding 34 of the indicator unit through terminal 64, conductor 65, the previously mentioned resistor 58, a zero temperature coefficient calibrating resistor 66 and conductor 67.

Calibration of the indicator unit is effected by the calibrating resistor 66 and an adjustable positive temperature coefficient calibrating resistor 68 connected directly across the inter-unit conductors 14 and 16, i. e., in shunt to windings 32 and 36. The value of the shunt resistance is controlled by an adjustable calibrating arm 70, one end of which is in electrical contact with terminal 44. (See Fig. 3.) The manner in which calibration is effected by adjustment of the series and shunt resistors 66 and 68 to overcome slight variations in electrical and magnetic characteristics resulting from manufacturing tolerances and variations in material is described in greater detail hereinafter.

The number of inter-unit conductors is reduced by utilizing inter-unit conductor 20 to conduct battery current utilized in actuation of the odometer 74, illustrated diagrammatically and comprising a solenoid 76. Since the odometer may be of the usual construction comprising a pawl and ratchet actuated counter and an actuating solenoid, the odometer has not been described or illustrated in detail. One terminal of the solenoid 76 is connected to inter-unit conductor 20 by a conductor 78 and the other terminal is connected by a conductor 80 to the usual battery 82, preferably through a switch 84 which may be the ignition switch controlling also, in a manner not shown, the other circuits of the vehicle. One terminal of the battery is grounded in customary manner, as indicated at 86.

The solenoid 76 is energized intermittently to actuate the odometer indicator through normally open cam actuated contact structure, indicated generally by reference character 88. One contact 90 is connected to the inter-unit conductor 20 through the previously mentioned conductor 62 and the other contact 92 is grounded at 94. Each time the cam 96 brings contacts together, a complete energizing circuit for the solenoid 76 is completed through a circuit including, in part, the ignition switch 84 (in its closed position), the inter-unit conductor 20, and the contacts. Since the battery supplies direct current, the battery current is effective only to operate the odometer because the sending and indicator units are both insulated from ground. It has been found that the battery current has no appreciable effect upon the readings of the speedometer.

The physical construction of the indicator unit is illustrated in detail in Figs. 2 to 5, inclusive. From Fig. 2 it may be seen that the unit is divided into three compartments, namely, an indicator compartment 100, an armature and rotor compartment 102, and a combined terminal and resistor compartment 104. Each of the compartments is formed of a centrally apertured cup-like housing suitably attached to the other housings, as by welding.

The combined terminal and resistor housing 104 comprises a cup-like member 106 having flattened sides, the open end of which is closed by an insulating plate 108 to which are secured the terminal bolts 44, 54, and 64. The plate, which has a shape corresponding to that of the member 106, is secured to the latter by bent-over fingers 110 and indentations 112 adapted to engage opposite sides of the peripheral portion of the plate. The terminal bolts are secured to the plate by lock washers and nuts 114 and the conductor terminals 115 are secured to the bolts by lock washers and nuts 116.

The negative temperature coefficient resistor 68 is supported upon a pair of terminals 122 and 124. The former is secured in position by the terminal bolt 64 and the latter by a rivet 126 extending through the insulating plate 108. The resistor is connected to these terminals by suitable conductors in electrical conducting relationship with the resistor and the terminals.

The calibrating resistance 68 (see Fig. 3) is preferably wound around a relatively wide strip 128 of insulating material spaced from the closure plate 108 and secured in place by the terminal bolts 44 and 54. The ends of the resistor are connected to terminals 130 and 132, respectively, which are in electrical conducting relationship with the terminal bolts 44 and 54. The calibrating arm 70 is pivotally mounted for rotation upon the terminal bolt 44 and is adapted, when rotated, to vary the resistance in shunt across the terminals 44 and 54 within desired limits, as necessitated by the electrical and magnetic characteristics of the indicating and sending units. The calibrating arm is provided with a silver contact 134 opposite the pivot end and with an upwardly extending lug or projection 136 whereby it may be readily rotated.

A length of resistance wire 66, having a substantially zero temperature coefficient of resistance, is attached at one end to the terminal 124 and at the other to the conductor 67 which leads to winding 34 of the fixed armature.

The armature and rotor unit 102 (see Figs. 2 and 4) consists of a casing 140, the transverse portion of which is spot welded to the transverse portion of casing 106. The bottoms are apertured centrally to receive a hollow bushing 142 provided with an outwardly facing shoulder 144 upon which the transverse portions of the housings 106 and 140 rest and to which the latter are secured, as by the peening 146.

The armature, which comprises the fixed windings 32, 34, and 36, is mounted upon an armature shaft 150 made hollow for a reason appearing shortly, and provided with an intermediate enlarged portion 152 providing a shoulder abutting against one end of the bushing 142. The armature shaft is detachably secured to the bushing by a nut 154 threaded onto the left end thereof, as shown in Fig. 2. The other end of the enlarged portion 152 provides a shoulder upon which the armature laminations 156 and a pair of end insulator laminations 158 are supported. An insulating bushing 160, one end of which rests against shoulder 144 of the bushing, serves to insulate the armature windings from the shaft. The right end of the armature shaft is provided with an enlarged hollow opening 162, the extreme end of which is peened over to secure the laminations in place.

The shape of the armature laminations is best illustrated in Fig. 4 from which they may be seen to comprise a central hub portion 164 and radially extending generally T-shaped teeth 166 defining spaced-apart substantially elliptical slots 168.

The armature windings 32, 34, and 36 are distributed in the slots, which are six in number, and each phase winding comprises a pair of series connected coils. The coils for one phase winding lie in slots 1, 3 and 4, 6, if it be assumed that the slots 168 are numbered consecutively from 1 to 6 in a clockwise direction, as viewed in Fig. 4. The coils for the second phase winding lie in slots 2, 4 and 5, 1, and the coils for the third phase winding lie in slots 3, 5 and 6, 2. The windings are so disposed that, when supplied with a three-phase alternating current from the sending unit, a two-pole revolving magnetic field is produced in a manner well known to those skilled in the art. This revolving field induces rotation of the previously mentioned speed cup 40 provided with a relatively long portion 172 lying axially of the armature and spaced about .020 inch therefrom.

Laminations 174, concentrically arranged with respect to the armature laminations and surrounding a part of the axial portion of the speed cup, provide a return path for the magnetic flux set up by the armature winding. The laminations are spaced about .020 inch from the speed cup and are held in fixed position by indented portions 176 of the housing 140, which engage the opposite sides of the assembled laminations.

The speed cup is mounted upon a rotatable indicator shaft 178 by a flanged bushing 180 securely affixed to the shaft and a bushing 182 pressed upon the former. Rotation of the speed cup may be limited by a stop 186 (see Figs. 2 and 5) mounted for rotation with the latter by the opposed flange 184 and bushing 182, and cooperatively associated with a fixed but slightly resilient piano wire stop 188 secured to a relatively narrow indicator shaft and dial support 190 attached to a peripheral radial flange 192 formed integrally with the casing 140 by screws 191 in a position determined by dowels 191—A.

The speed cup stops 186 and 188 may be eliminated, if desired, by proper selection of hair spring. The spring could be strong enough to prevent rotation of the speed cup more than a full rotation from its normal position. The elimination of the stop avoids certain inaccuracies at the lower speeds when the stops are moved out of engagement with each other, when they have a tendency to stick together, and when moved, move with a sudden jerk.

The indicator shaft is journaled for rotation in spaced-apart combined guide and thrust bearings 193 and 194 mounted in the armature shaft 150 and in the support 190, respectively. The bearing 193 is mounted in a cup 196 fitted into the enlarged opening 182 in the armature shaft so that it may be easily removed therefrom by a suitable tool fitting into the smaller opening at the other end of the shaft. The bearing 194 is mounted in a bushing 200 threaded into the support 190 and secured in place upon the latter by a nut 202.

The rotation of the speed cup is restrained by a spiral hair spring 204, one end of which is attached to the indicator shaft and the other to an axially extending projection 206 of an adjustable spring adjuster 208. The latter is mounted for rotation about the nut 202, and may be rotated readily by an axially extending projection 210.

The front bearing and dial support 190 is made relatively rigid by bending portions 212 thereof rearwardly. The speed cup stop 188 is attached to the support by a pair of dowels 214 and a screw 215.

The indicator dial 218 is attached to the opposite ends of support 190 by a pair of screws 220. The dial is apertured centrally so that the shaft may extend therethrough, and an indicator needle 222 is mounted upon the projecting end of the shaft. The dial is provided with suitable indicia, not shown, so that the needle indicates the speed of the vehicle as determined by the position of the speed cup.

The indicator compartment is formed by a cup-like housing 224 spot welded to the flange 192 of housing 140 and terminates in an outwardly extending peripheral flange 226. An annular ring 228 having a flange similar to the flange 226 is held in fixed relationship with the flange by a bezel 230, which acts also to hold in place the usual dial glass 232. The glass 232 is resiliently held in place between a relatively solid annular gasket 234 and a hollow gasket 236.

The indicator unit as a whole may be mounted upon a suitable support, such as the instrument panel of an automobile (not shown) by a plurality of extensions 240 welded to the housing 224.

The armature windings of the above-described structure extend a substantial distance beyond the ends of the armature laminations. This difficulty can be avoided by utilizing the novel form of armature illustrated in Fig. 6. Referring now to this figure, it may be seen that the windings are shown diagrammatically upon an armature lamination 400. The important features of the illustrated construction are a decrease in the length of wire required and in the distance the windings extend beyond the ends of the laminations. These advantages are the result of locating the coils comprising the various phase windings so that no coil need be wound over another, as in the previously described construction.

The armature laminations comprise an apertured central hub portion 402 and three identical radially extending portions 404 dividing into opposed arcuate branches 406. The branches 406 extend radially outward, as indicated by reference characters 408, and terminate in arcuate peripheral portions 410 facing each other. The described armature laminations define two radially spaced apart groups of slots 412 and 414. The former are positioned adjacent the hub and the latter between the former and the peripheral portion.

Figure 6:
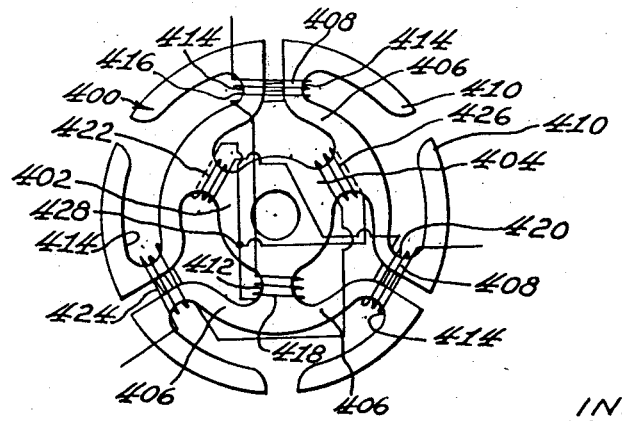
Fig. 6 is a plan view of a modified form of armature lamination adapted to be used in the indicator unit. The armature windings have been shown diagrammatically.

Each phase winding comprises a coil surrounding an inner radial portion 404 of the armature laminations and one surrounding adjacent radial portions 408, the coils for one armature winding being indicated by reference characters 416 and 418, for a second by 420 and 422, and for the third by 424 and 426. Like ends of the windings are joined together to form the neutral connection 428. The various coils and phase windings are connected so as to produce a revolving magnetic field when they are supplied with three-phase alternating current, substantially as indicated in Fig. 6.

Among the noteworthy advantages of my invention may be mentioned the simplicity of manufacture of the various parts and the assembly thereof to form the above described indicated unit. The various resistors and terminals are adapted to be mounted upon an insulating closure plate easily attached to its associated unit. The armature and armature windings are readily assembled as a sub-unit with their associated shafts, and these units are easily attachable to their respective units. The rotor of the indicator unit is also easily assembled as a sub-unit which may be readily positioned with respect to the other sub-units.

In operation the various windings and resistors of the indicator unit, the sending unit, and the odometer are connected electrically, as indicated in Fig. 1. When so connected and the permanent magnet rotor of the sending unit is connected to the transmission in suitable manner and the ignition switch 84 is closed to complete the odometer circuit, then, when the automotive vehicle moves, the rotor of the sending unit is rotated at a speed proportional to that of the vehicle to induce a polyphase alternating current in fixed armature of the sending unit. The polyphase alternating currents flow through the fixed armature of the indicator unit and produce a revolving field which induces rotation of the speed cup with a torque depending upon the speed of the vehicle. Rotation of the speed cup is resisted by the spiral hair spring so that the speed cup assumes a position dependent upon the speed of the vehicle.

The described arrangement produces a deflection of the indicator needle that is not exactly a straight line relation to the speed of the vehicle, but the scale is so designed that a proper indication of the speed is given at all times. The deflection of the indicator unit per unit change in speed decreases gradually at the higher and lower speeds.

The odometer 14 is actuated intermittently when the vehicle moves and when the ignition switch 84 is closed, as it ordinarily is when the vehicle is moving. Each time the cam 96 effects engagement of contacts 80 and 82, the solenoid is energized through a previously described circuit which includes a battery 82 and inter-unit conductor 20. The direct current flowing through this circuit has no appreciable effect upon the armature windings or upon the reading of the speedometer.

The permanent magnet rotor of the sending unit is preferably rotated at a speed or 2,000 R. P. M. when the vehicle is traveling at a rate of 60 M. P. H. This speed is, as known to those skilled in the art, approximately twice as fast as the speed of the permanent magnet rotor of a mechanical speedometer. Rotation of an integral permanent magnet rather than of a wound armature eliminates slip rings and brushes with their attendant wear, variable resistances and the like, and also the likelihood of the windings being deleteriously affected by long continued rotation at high speeds.

While I have described in said prior application Serial No. 243,977 an arrangement wherein the sending unit comprises a rotor having six poles and an armature winding comprising nine teeth, each of which is encircled by 100 turns of No. 26 double enamelled wire and adapted to be rotated at speeds indicated above, these values may be modified. The indicator unit associated with the sending unit and shown in the present application comprises an armature, the phase windings of which each consist of two series connected coils each having 86 turns of No. 26 double enamelled wire. The phase windings of the sending unit armature have a resistance of about two ohms, measured from terminal to neutral and those of the receiving unit have substantially the same resistance.

The described construction and arrangement of the sending unit provides a substantially sinusoidal wave form. However, slight variations from a sine wave do not materially affect the operation of the speedometer as a whole, because the higher harmonics do not exert a substantial torque because of their high frequency. It is this factor, that is, the increase in torque with increase in frequency (up to a certain value of frequency and for further increases in frequency a decrease in torque), which governs the sending unit rotor speed. It is not desirable to increase the fundamental frequency of the generated current too high.

The negative temperature coefficient resistors may all have identical values, but since the manufacturing processes by which they are made produce slight variations the resistor 58 at the receiving unit is chosen to have a resistance of approximately four ohms while the resistors at the sending unit have values of about four and five ohms. The zero temperature coefficient compensating resistor 66 has a value of approximately two ohms and the positive temperature coefficient resistor has a total value of about thirty-two ohms and may be varied from this value to about twenty-two ohms by the calibrating arm 70. The various resistors may be made from suitable materials now available on the market.

The negative temperature coefficient resistors and the positive temperature coefficient shunt resistor function to offset the change of resistance of both the armature windings and the speed cup irrespective of whether it be due to changes in ambient temperature or current flow. The negative temperature coefficient resistors have substantially the same physical proportions, and when located as described, i. e., two at the sending unit and one at the indicator unit, then uniform results are obtainable when both units are located in regions where the temperatures are in the neighborhood of zero or 70 degrees F., or when the sending unit is in a region of zero degrees F. and the indicator unit in a region of 70 degrees F., as in the usual automobile installation.

The negative temperature coefficient resistors at the sending unit are designed to overcompensate for variations in resistance of the windings because of temperature changes, i. e., they decrease the resistance somewhat more than the resistance is increased by a rise in temperature, and vice versa. The effect of this overcompensation is to provide compensation for the effect of temperature changes upon the magnetism of the permanent magnet rotor, which decreases with an increase in temperature. A decrease in the strength of the magnetism upon an increase in temperature results in a decrease in the magnitude of the current but, since the resistance of the negative temperature coefficient resistors decreases more than enough to compensate for the decrease in magnitude resulting from an increase in the temperature of the windings, compensation is provided for the decrease in magnetism.

Negative temperature coefficient resistors now available in the market (having a resistance of 4 ohms plus or minus 10 per cent at 70 degrees F. and exhibiting a negative resistance change of .8 ohms plus or minus 10 per cent for a temperature change from 0 to 100 degrees F.) as well as the usual negative temperature coefficient resistors made of carbon or carbon compounds exhibit a characteristic that varies with the range in temperature. At lower temperatures the unit change in resistance per unit change in temperature is comparatively greater than at high temperatures. It has been found that when the sending unit is placed in a region of 200 degrees F., the aforementioned resistors obtainable in the market do not provide sufficient compensation. An excellent way to provide the additional compensation is by utilization of an annular fixed magnetic unit (not shown, but fully described in my copending application Serial No. 243,977) surrounding the permanent magnet rotor, the magnetism of which decreases with increases in temperature sufficiently to provide the desired additional compensation. Since the magnetism is greater at lower temperatures than at higher, more of the flux available from the permanent magnet rotor is shunted from the armature windings at lower than at higher temperatures, i. e., as the temperature increases the decrease in the strength of the permanent magnet is compensated for by decreasing the amount of flux shunted by the ring.

It should be observed that the ring may be used, not only in conjunction with the negative temperature coefficient resistors, but also in place thereof. By properly choosing a ring it may be made to overcompensate, that is, increase the effective magnet strength more than it is decreased by a change in temperature, and vice versa, thereby to compensate, at least in part, for changes in resistance of the armature winding.

The negative temperature coefficient and positive temperature coefficient resistors 58 and 68 at the indicator unit are also designed conjointly to effect similar overcompensation for resistance variations and thereby compensate for variations in the resistance of the induction type rotor occasioned by temperature changes. The action of resistor 58 is the same as that of the resistors heretofore described. The shunt resistor, even though it has a positive coefficient, actually exhibits the characteristics of a negative temperature coefficient resistor because of its location in the circuit. When the temperature increases, its resistance increases so that a lesser portion of the total current flows through it, thereby to increase the portion of the current flowing through the armature winding.

The shape of the deflection-speed curve of the indicator unit is governed by the ratio of the resistance to the reactance in the circuit as a whole. This ratio can be adjusted by varying the values of the series resistance 66, the variation of which has no effect upon the reactance, and of the shunt resistance 68, the variation of which is the equivalent of a change in the reactance and the resistance of the circuit. Consequently, it is possible readily and properly to calibrate the indicator for various types of hair springs as well as for variations in the physical construction of units, which determine the reactance of the system.

Ordinarily, calibration may be effected at three points, at a minimum point of 10 M. P. H., where the indicator becomes effective, an intermediate point of 30 M. P. H., and at a high point of 60 M. P. H. The first calibration is governed by the hair spring and stop location, and the two others are obtained by selective variation of the two resistors to make the deflection-speed curve pass through the proper points—i. e., to make the indicator read 30 and 60 M. P. H. when the vehicle is moving at these speeds.

While I have indicated my invention is applicable for indicating the speeds of automobiles, it should be understood that this is its preferred use and that the indicator may be utilized to indicate the speeds of other moving objects. However, there are particular advantages that make the invention peculiarly adapted for use in vehicles.

Having thus described my invention, what I claim as new and desire to secure by Letters Patent is:

1. In apparatus of the type described, the combination including, an apertured cup-like housing, a second apertured cup-like housing, said housings being disposed back-to-back with the apertures in alignment and opening in opposite directions, means including a hollow support passing through the apertures for securing the housings together, a winding in one of said housings, and cooperating resistance means mounted in the other housing.

2. In apparatus of the type described, the combination including, an apertured cup-like housing, a second apertured cup-like housing, said housings being disposed back-to-back with the apertures in alignment and opening in opposite directions, a hollow bushing passing through the apertures for securing the housings together, a hollow support passing through and secured to said bushing, an armature mounted in fixed position on said support in one of said housings, and cooperating resistance means mounted in the other housing.

3. In apparatus of the type described, the combination including, an apertured cup-like housing, a second apertured cup-like housing, said housings being disposed back-to-back with the apertures in alignment and opening in opposite directions, means defining a hollow support passing through the apertures and extending from one of said housings into the other, a bearing mounted in said hollow support for removal through one end thereof, a second bearing, means supporting said second bearing from the other of said housings, a shaft rotatably supported by said bearings, an armature mounted in fixed position on said hollow support in one of said housings, a rotor mounted on said shaft in the field of said armature, and cooperating resistance means in said other housing.

4. In apparatus of the type described, the combination including, an apertured cup-like housing, a second apertured cup-like housing, said housings being disposed back-to-back with the apertures in alignment, means defining a hollow support passing through the apertures and extending into one of said housings, a support spaced from said hollow support, an indicator shaft rotatably mounted upon said supports, an induction type rotor mounted upon said shaft, and an armature winding fixedly secured to said hollow support adapted, when energized, to effect rotation of said rotor.

5. In apparatus of the type described, the combination including, an apertured cup-like housing, a second apertured cup-like housing, said housings being disposed back-to-back with the apertures in alignment, means defining a hollow support passing through the apertures and extending into one of said housings, a support spaced from said hollow support, an indicator shaft rotatably mounted upon said supports, an induction type rotor mounted upon said shaft, an armature winding fixedly secured to said hollow support adapted, when energized, to effect rotation of said rotor, a stop associated with said shaft for limiting movement thereof, and single means securing said rotor and stop to said shaft.

6. In apparatus of the type described, the combination including, an apertured cup-like housing, a second apertured cup-like housing, said housings being disposed back-to-back with the apertures in alignment, means defining a hollow support passing through the apertures and extending into one of said housings, a support spaced from said hollow support, an indicator shaft rotatably mounted upon said supports, an induction type rotor mounted upon said shaft, an armature winding fixedly secured to said hollow support adapted, when energized, to effect rotation of said rotor, a stop associated with said shaft for limiting movement thereof, single means securing said rotor and stop to said shaft, and a resilient stop mounted upon one of said shaft supports cooperatively associated with said first-mentioned stop.

7. In apparatus of the type described an apertured cup-like housing, a second apertured cup-like housing, said housings being disposed back-to-back with the apertures in alignment, a hollow support extending into one of said housings for securing them together, a closure plate for the other of said housings, said closure being made of insulating material, terminals and resistors mounted upon said closure plate, a fixed armature winding mounted upon the portion of said hollow support extending into said one of the housings, a combined bearing and dial support secured to the open end of said one housing, a bearing supported in the hollow of said hollow support, a bearing supported by said combined bearing and dial support, a shaft rotatably mounted upon said bearings, an induction type cup-like rotor attached to said indicator shaft and having a portion concentric with respect to and surrounding said armature winding, an armature field supported internally of said one cup-like housing concentrically with respect to said armature, a dial plate secured to said combined bearing and dial support, and a third cup-like housing secured to said one cup-like housing, a dial enclosing glass supported thereby, and an indicator needle attached to said indicator shaft and located between said dial and dial enclosing glass.

8. In apparatus of the type described, an apertured cup-like housing, a second apertured cup-like housing, said housings being disposed backto-back with the apertures in alignment, a bushing having a shoulder against which said housings abut for securing the latter together, a closure plate for one of said housings, said closure being made of insulating material, terminals and resistors mounted upon said closure plate, a hollow shaft secured to and extending through the bushing into the other housing, a fixed armature winding mounted upon said hollow shaft, a combined bearing and dial support secured to the open end of said one housing, said shaft having an enlarged hollow portion at one end, a bearing supported in the enlarged portion of said hollow support, a bearing supported by said combined bearing and dial support, a shaft rotatably mounted upon said bearings, an induction type cup-like rotor attached to said indicator shaft and having a portion concentric with respect to and surrounding said armature winding, an armature field supported internally of the other cup-like housing concentrically with respect to said housing, a dial plate secured to said combined bearing and dial support, and a third cup-like housing secured to said one cup-like housing, a dial enclosing glass supported thereby, and an indicator needle attached to said indicator shaft and located between said dial and dial enclosing glass.

9. In an indicator, the combination including, a pair of supports, bearings mounted in said support, an indicator shaft rotatably supported by said bearings, a flanged bushing mounted upon said shaft, an apertured induction type rotor mounted upon said bushing, an apertured stop mounted upon said bushing, means adjustably securing said rotor and stop upon said bushing in fixed angular relation to each other, and a stop mounted upon one of said pair of supports cooperatively associated with said first-mentioned stop.

10. In indicating apparatus of the type adapted to be energized by a polyphase alternating current, magnetic armature structure having a plurality of radially and circumferentially extending slots, said slots being spaced apart radially into two radially separated groups and the slots in each group being displaced relative to those in the other group, thereby to provide two groups of radially extending teeth located at different radial distances from the axis of the armature and spaced apart substantially equal angular distances, and phase windings each comprising coils wound around teeth in each of the two groups.

11. In indicating apparatus, a source of three phase alternating current, indicating means comprising a star-connected three-phase armature winding connected to produce a two-pole revolving field and an induction type rotor actuated thereby, each phase winding of said armature consisting of two diametrically opposed coils, a stator of magnetic material supporting said coils, said stator comprising structure having a transverse cross section having a central apertured portion, three equi-spaced relatively narrow radially extending portions, around each of which one coil of each phase winding is wound, said radial portion being divided into two portions extending first circumferentially in opposite directions, then radially outward, and finally circumferentially toward each other, the last mentioned radially and outwardly extending portions being relatively near similar portions of adjacent sections, and the second coil of each phase being wound about adjacent radially and outwardly extending portions.

12. In apparatus of the type described, the combination including, a pair of apertured cup-like housings disposed back-to-back with the apertures in alignment and opening in opposite directions, a hollow bushing passing through the apertures for supporting the housings, an armature shaft passing through said support from one housing into the other, an armature winding supported by said shaft in one housing, and means in the other housing for detachably securing the shaft in place relative to the bushing.

HORACE M. NORMAN.